US012744613B2

(12) United States Patent
Chen

(10) Patent No.: US 12,744,613 B2
(45) Date of Patent: Sep. 22, 2026

(54) MAPPING MULTIPLEXING METHOD AND APPARATUS FOR OPTICAL TRANSPORT NETWORK, AND ELECTRONIC DEVICE AND STORAGE MEDIUM

(71) Applicant: SANECHIPS TECHNOLOGY CO., LTD., Shenzhen (CN)

(72) Inventor: Sisi Chen, Shenzhen (CN)

(73) Assignee: SANECHIPS TECHNOLOGY CO., LTD, Shenzhen (CN)

( * ) Notice: Subject to any disclaimer, the term of this patent is extended or adjusted under 35 U.S.C. 154(b) by 261 days.

(21) Appl. No.: 18/708,793

(22) PCT Filed: Feb. 28, 2022

(86) PCT No.: PCT/CN2022/078507
§ 371 (c)(1),
(2) Date: May 9, 2024

(87) PCT Pub. No.: WO2023/082500
PCT Pub. Date: May 19, 2023

(65) Prior Publication Data

US 2025/0007638 A1 Jan. 2, 2025

(30) Foreign Application Priority Data

Nov. 9, 2021 (CN) ......................... 202111322492.2

(51) Int. Cl.
*H04J 3/16* (2006.01)
*H04J 14/08* (2006.01)

(52) U.S. Cl.
CPC ............ *H04J 3/1652* (2013.01); *H04J 14/08* (2013.01); *H04J 2203/0069* (2013.01); *H04J 2203/0076* (2013.01)

(58) Field of Classification Search
CPC .. H04J 3/1652; H04J 14/08; H04J 2203/0069; H04J 2203/0076
(Continued)

(56) References Cited

U.S. PATENT DOCUMENTS 10,116,403 B2 * 10/2018 Gareau ................. H04J 3/1664
2021/0328703 A1 * 10/2021 Iovanna ............. H04J 14/0252

FOREIGN PATENT DOCUMENTS

CN 101022677 A 8/2007
CN 109728927 A 5/2019
(Continued)

OTHER PUBLICATIONS

Wei SU Huawei Technologies, Analysis of OSU mapping and multiplexing mechanism, vol. 11/15, Mar. 30, 2021, pp. 1-7, XP044308082 (Year: 2021).*
(Continued)

*Primary Examiner* — Dalzid E Singh
(74) *Attorney, Agent, or Firm* — CANTOR COLBURN LLP

(57) ABSTRACT

A mapping and multiplexing method for an optical transport network, an electronic device, and a storage medium are provided. The method includes: first providing a mapping opportunity generated by an OPU in a current transport window to one or more OSU services, which satisfy a first scheduling condition, in a first queue, and performing in-queue scheduling on the one or more OSU services; in a case where there is no OSU service satisfying the first scheduling condition in the first queue, providing the mapping opportunity to one or more OSU services, which satisfy a second scheduling condition, in a second queue, and performing in-queue scheduling on the one or more OSU services; updating a remaining service mapping opportunity quantity of the OSU service which gets the mapping opportunity; and
(Continued)

dynamically allocating OSU services entering mapping and multiplexing in the current transport window to the first queue and the second queue.

19 Claims, 4 Drawing Sheets

(58) Field of Classification Search
USPC .......................................................... 398/98
See application file for complete search history.

(56) References Cited

FOREIGN PATENT DOCUMENTS

| | | |
|---|---|---|
| CN | 110830426 A | 2/2020 |
| CN | 111865887 A | 10/2020 |
| CN | 112584259 A | 3/2021 |
| WO | 2017036178 A | 3/2017 |

OTHER PUBLICATIONS

International Search Report for corresponding application PCT/CN2022/078507 filed Feb. 28, 2022; Mail date Jul. 27, 2022.
Chen Xiaoxhou, Standard Recommendations for IEE P2839 Flexible Optical Service Unit (OSUflex) of Optical Transport Network (OTN) in Electric Power Systems, Dec. 1, 2020, pp. 1-57, XP068256980.
European Search Report for corresponding EP22891312; Report dated Jan. 30, 2025.
International Telecommunication Union, Considerations on OSU Mapping Jitter Impact on CBR services, WD11-29r1, Feb. 2021.
Wei SU Hua Technologies, Analysis of OSU mapping and multiplexing mechanism, vol. 11/15, Mar. 30, 2021, pp. 1-7, XP044308082.

* cited by examiner

Fig. 2

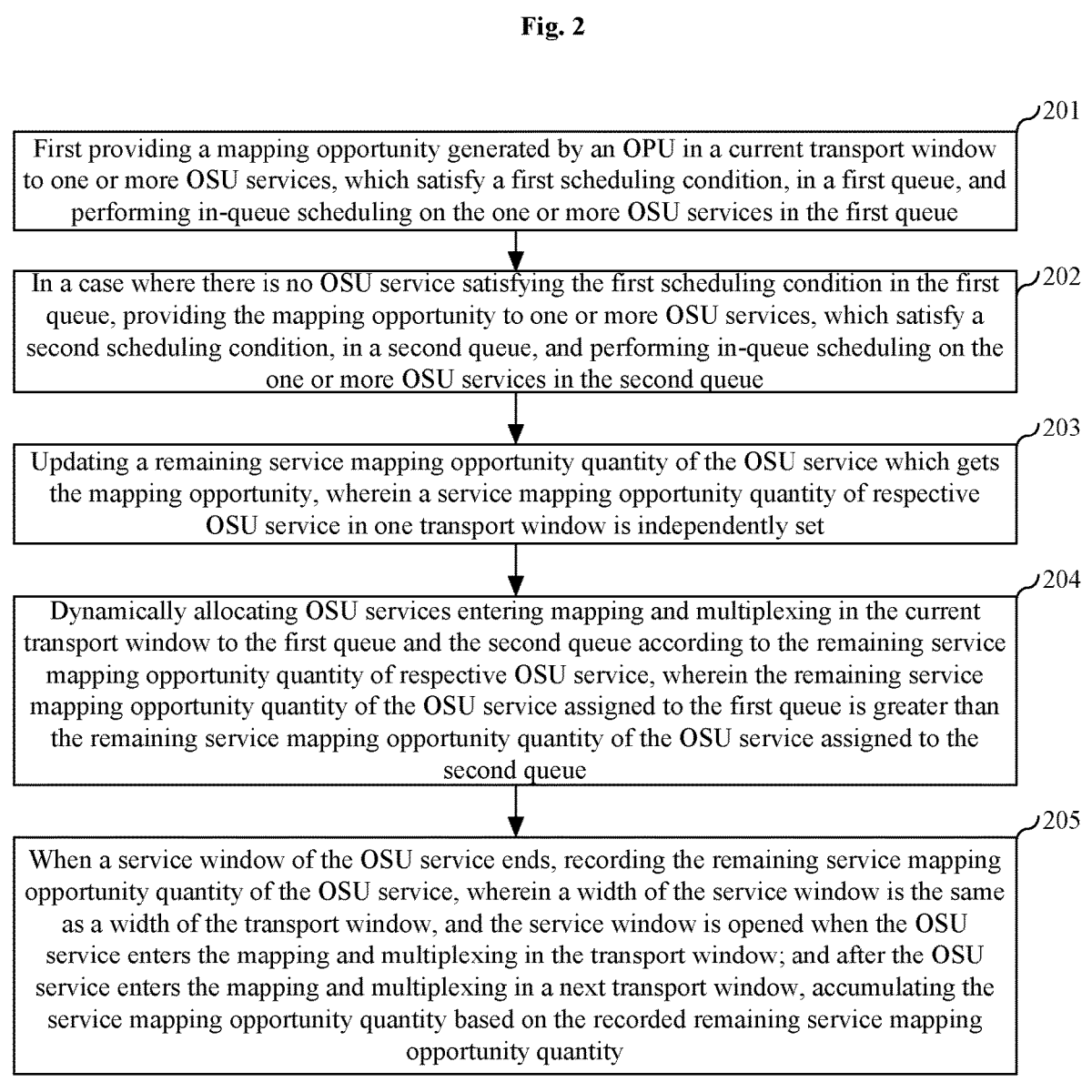

201
First providing a mapping opportunity generated by an OPU in a current transport window to one or more OSU services, which satisfy a first scheduling condition, in a first queue, and performing in-queue scheduling on the one or more OSU services in the first queue 202
In a case where there is no OSU service satisfying the first scheduling condition in the first queue, providing the mapping opportunity to one or more OSU services, which satisfy a second scheduling condition, in a second queue, and performing in-queue scheduling on the one or more OSU services in the second queue 203
Updating a remaining service mapping opportunity quantity of the OSU service which gets the mapping opportunity, wherein a service mapping opportunity quantity of respective OSU service in one transport window is independently set 204
Dynamically allocating OSU services entering mapping and multiplexing in the current transport window to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue 205
When a service window of the OSU service ends, recording the remaining service mapping opportunity quantity of the OSU service, wherein a width of the service window is the same as a width of the transport window, and the service window is opened when the OSU service enters the mapping and multiplexing in the transport window; and after the OSU service enters the mapping and multiplexing in a next transport window, accumulating the service mapping opportunity quantity based on the recorded remaining service mapping opportunity quantity

Fig. 5

501
Processor
502
Memory

MAPPING MULTIPLEXING METHOD AND APPARATUS FOR OPTICAL TRANSPORT NETWORK, AND ELECTRONIC DEVICE AND STORAGE MEDIUM

CROSS-REFERENCE TO RELATED APPLICATION

This application is a National Stage Filing of the PCT International Application No. PCT/CN2022/078507 filed on Feb. 28, 2022, which is based upon and claims priority to Chinese Patent Application No. 2021113224922, filed on Nov. 9, 2021, the entire disclosure of which is incorporated herein by reference.

TECHNICAL FIELD

The present disclosure relates to the field of optical communications technologies, and in particular, to a mapping and multiplexing method for an Optical Transport Network (OTN), an electronic device, and a storage medium.

BACKGROUND

An Optical Service Unit (OSU) technology is an emerging technology in the transport field. According to the OSU technology, a large number of small-granularity user services are mapped onto OSU frames, a payload area of the OTN is divided into multiple Payload Blocks (PBs), and the OSU frames are multiplexed into the PB blocks to complete the transmission of OSU frames via the OTN optical interface. There are related draft standards in which the technical requirements of the OSU technology are specified, including network architecture, functional structure, bit rate, user signal mapping, multiplexing, lossless bandwidth adjustment, protection, management and control, and pass-through, etc. A key technology is the mapping and multiplexing of multiple user services into a payload area of an Optical Channel Payload Unit (OPU) of the optical transport network.

The OSU frames are generally mapped and multiplexed to the payload area of the OPU by determining the PB position using a sigma-delta algorithm and polling scheduling. However, the methods for determining the PB position by using the sigma-delta algorithm and the polling scheduling are applicable to the scenario that the OSU service has a constant rate or a small rate jittering range. When the rate jitter of the OSU service is large, both the above two methods would lead to large deviation between the OSU service rate and the bearer bandwidth, which results in low mapping opportunity utilization efficiency and low mapping bearing efficiency.

SUMMARY

Provided is a mapping and multiplexing method for an optical transport network, the mapping and multiplexing method including: first providing a mapping opportunity generated by an Optical Channel Payload Unit (OPU) in a current transport window to one or more Optical Service Unit (OSU) services, which satisfy a first scheduling condition, in a first queue, and performing in-queue scheduling on the one or more OSU services, which satisfy the first scheduling condition, in the first queue so as to provide the mapping opportunity to one of the one or more OSU services in the first queue; in a case where there is no OSU service satisfying the first scheduling condition in the first queue, providing the mapping opportunity to one or more OSU services, which satisfy a second scheduling condition, in a second queue, and performing in-queue scheduling on the one or more OSU services, which satisfy the second scheduling condition, in the second queue so as to provide the mapping opportunity to one of the one or more OSU services in the second queue; updating a remaining service mapping opportunity quantity of the OSU service which gets the mapping opportunity, wherein a service mapping opportunity quantity of respective OSU service in one transport window is independently set; and dynamically allocating OSU services entering mapping and multiplexing in the current transport window to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue.

Also provided is a mapping and multiplexing apparatus for an optical transport network, the mapping and multiplexing apparatus including: a first scheduling module, configured to first provide a mapping opportunity generated by an Optical Channel Payload Unit (OPU) in a current transport window to one or more Optical Service Unit (OSU) services, which satisfy a first scheduling condition, in a first queue, and perform in-queue scheduling on the one or more OSU services in the first queue so as to provide the mapping opportunity to one of the one or more OSU services in the first queue; a second scheduling module, configured to, in a case where there is no OSU service satisfying the first scheduling condition in the first queue, provide the mapping opportunity to one or more OSU services, which satisfy a second scheduling condition, in a second queue, and perform in-queue scheduling on the one or more OSU services in the second queue so as to provide the mapping opportunity to one of the one or more OSU services in the second queue; and an updating module, configured to update a remaining service mapping opportunity quantity of the OSU service which gets the mapping opportunity, wherein a service mapping opportunity quantity of respective OSU service in one transport window is independently set; wherein OSU services entering mapping and multiplexing in the current transport window are dynamically assigned to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue.

Also provided is an electronic device, including: at least one processor, and a memory communicatively coupled to the at least one processor; wherein the memory stores an instruction executable by the at least one processor, and the at least one processor is configured to run the instruction to execute the mapping and multiplexing method for the optical transport network.

Also provided is a computer-readable storage medium, which stores a computer program, wherein the computer program, when being executed by a processor, causes the processor to execute the mapping and multiplexing method for the optical transport network.

According to the mapping and multiplexing method for the optical transport network proposed in the embodiments of the present disclosure, in a mapping and multiplexing process of the optical transport network, a mapping opportunity generated by an Optical Channel Payload Unit (OPU) in a current transport window is first provided to one or more Optical Service Unit (OSU) services, which satisfy a first scheduling condition, in a first queue, and in-queue scheduling is performed on the one or more OSU services, which satisfy the first scheduling condition, in the first queue so as to provide the mapping opportunity to one of the one or more OSU services in the first queue; in a case where there is no OSU service satisfying the first scheduling condition in the first queue, the mapping opportunity is provided to one or more OSU services, which satisfy a second scheduling condition, in a second queue, and in-queue scheduling is performed on the one or more OSU services, which satisfy the second scheduling condition, in the second queue so as to provide the mapping opportunity to one of the one or more OSU services in the second queue; a remaining service mapping opportunity quantity of the OSU service which gets the mapping opportunity is updated, wherein a service mapping opportunity quantity of respective OSU service in one transport window is independently set; and OSU services entering mapping and multiplexing in the current transport window are dynamically assigned to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue. By virtue of the solution, a transport window is set in an OPU, the mapping opportunity generated in the transport window is provided to an OSU service which needs mapping and multiplexing and satisfies a scheduling condition, in this way, when rate jitter of the OSU service happens, a smoothing effect can be achieved for the service rate, and the rate jittering tolerance of the OSU service during mapping and multiplexing can be expanded, furthermore, each mapping opportunity can be fully used, thereby improving the mapping bearing efficiency. The embodiments of the present disclosure solve the technical problems that, when the rate jitter of the OSU service is large, both the method using a sigma-delta algorithm and the method based on polling scheduling would lead to large deviation between the OSU service rate and the bearer bandwidth, which results in low mapping opportunity utilization efficiency and low mapping bearing efficiency.

BRIEF DESCRIPTION OF THE DRAWINGS

FIG. 2 is a flowchart of a mapping and multiplexing method for an optical transport network according to an embodiment of the present disclosure;

FIG. 5 is a schematic structural diagram of an electronic device according to an embodiment of the present disclosure.

DETAILED DESCRIPTION

Figure 1:
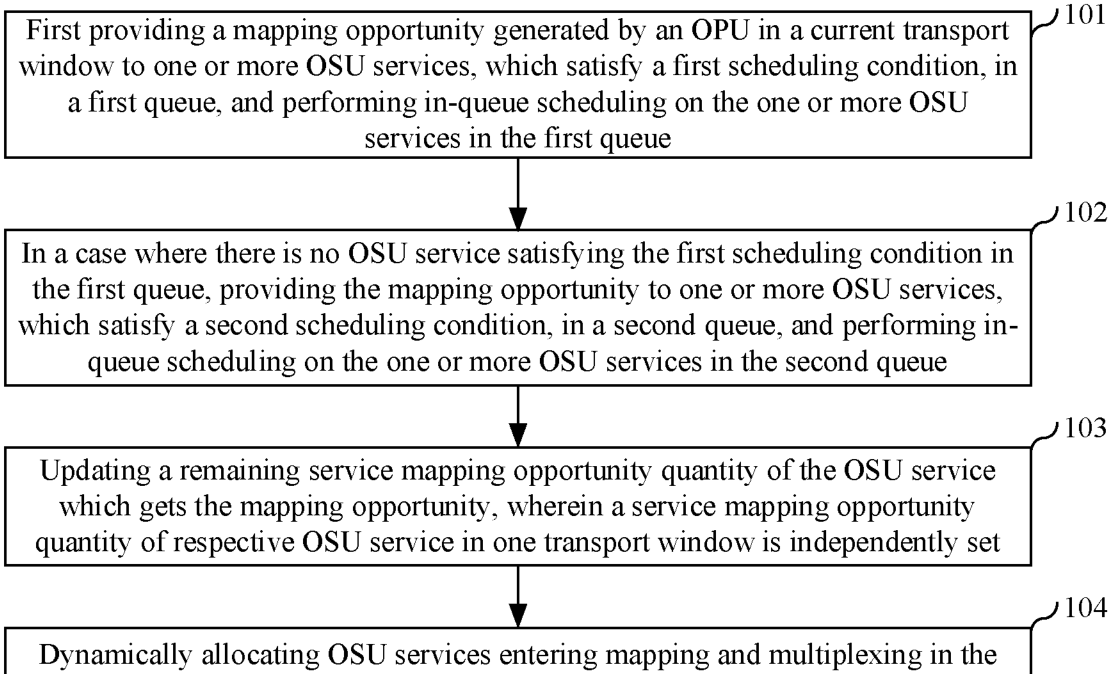
FIG. 1 is a flowchart of a mapping and multiplexing method for an optical transport network according to an embodiment of the present disclosure.

To make the objectives, technical solutions, and advantages of the embodiments of the present disclosure clearer, the following describes each embodiment of the present disclosure in detail with reference to the accompanying drawings. However, a person having ordinary skill in the art may understand that, in the embodiments of the present disclosure, many technical details are put forward to help a reader understand the present disclosure better. However, even without these technical details and various changes and modifications based on the following embodiments, the claimed technical solutions of the present disclosure can still be implemented. Dividing of the following embodiments is for convenience of description, and shall not constitute any limitation to specific implementations of the present disclosure. The embodiments may be referred to in combination with each other without any contradiction.

The related standard draft specifies two mapping mechanisms for mapping and multiplexing OSU frames of multi-channel user services to the payload area of the OPU of the OTN in the OSU technology.

The first mapping mechanism (using a sigma-delta algorithm): during mapping and multiplexing, the multi-channel OSU services respectively acquire their mapping opportunities, and then are mapped and multiplexed on P payload blocks in turn by polling scheduling. When there is no valid OSU service, an IDLE frame is inserted (an Operation, Administration, and Maintenance (OAM) frame is preferentially inserted when it is allowed to insert the IDLE frame). Each channel of OSU service has an independent payload block counter (initial values Δ of different payload block counters may be different, and may be randomly generated), wherein the payload block counter is used for continuously and evenly generating a mapping opportunity based on a period of P payload blocks, and thereafter, it is determined whether the OSU service can be mapped to the current Payload Block (PB) by performing judgment based on multiple conditions. The processing flow includes the following operations A to E. In operation A, initially, the mapping opportunity counter M=0, and the payload block counter j of the OSU service=Δ. In operation B, the payload block counter j is generated, and the value of j accumulates and cycles between 1 and P in sequence; when j=P, in a case where M>0, then M=1, the mapping opportunity is reserved to the next transport period window; otherwise, M is cleared to 0. In operation C, a sigma-delta algorithm is used to judge whether to generate a mapping opportunity, in a case where $j*C \bmod P<C$, 1 is added to the mapping opportunity counter M, otherwise, the mapping opportunity counter M is kept unchanged. In operation D, when the mapping opportunity counter is valid, i.e., M>0, the following judgments are further executed in sequence: whether at least one complete OSU frame is received and whether a polling scheduling condition is satisfied; in a case where the above conditions are met, then the flow proceeds to the mapping process (operation E); otherwise, no action is performed, and the flow skips to the processing for the next moment (operation B). In operation E, a single frame of the corresponding OSU service is mapped to a current payload block, at the same time, the mapping opportunity counter M of the OSU service is reduced by 1, and the flow skips to the processing for the next moment (operation B). When there is no valid OSU service, it is judged whether there is an OSU OAM frame, and in a case where there is an OSU OAM frame, the OSU OAM frame is inserted, otherwise an IDLE frame is inserted to the current payload block PB.

In the first mapping mechanism, because the number of opportunities of the user service in a period P is fixed to C, the bearer bandwidth of each user service is fixed, which means the pipe is a hard pipe. In addition, the remaining accumulated opportunity M value of one period P leaves one opportunity for the next period. When the rate jitter of the user service is large, the deviation between the real-time arrival rate and the bearer bandwidth is large. When the arrival rate of the user service is lower than C bearing opportunities, the number of the OSU data frames borne in the period P will be less than C, and the bearer bandwidth will be wasted. When the arrival rate of the user service is higher than C bearing opportunities, the period P can only bear C or C+1 OSU data frames at most, and excessive user service data needs to be cached, which requires a large amount of storage resources. In implementation, after such unbalanced rate lasts for a certain period of time, overflow of the buffer occurs, and lost of the data stream may happen. Therefore, the first mapping mechanism is applicable to an application scenario in which the user service rate undergoes traffic shaping before the user service reaches the mapping and multiplexing phase and the range of jitter of the arrival rate is limited.

The second mapping mechanism (determining the PB position through polling scheduling): the specific processing operations of mapping and multiplexing m channels of OSU services into P PBs of each transmission cycle of the OPU by way of pre-determining the PB position are as follows. A. the number $C_i$ of PBs occupied by each channel of OSU service is calculated according to the PB bandwidth divided by the ODU and the bandwidth of the OSU. B. The m channels of OSU services are arranged according to a descending order of bandwidths, and when multiple OSUs have the same bandwidth, the multiple OSUs are arranged according to a descending order of Tributary Port Numbers (TPN) of the OSUs, and the arranged OSUs form a set Q. C. The distribution position, in the P PBs, of the number $C_1$ of PBs occupied by each channel of OSU service in the set Q are sequentially calculated. For the first channel of OSU, the distribution position of $C_1$ PBs in the P PBs is calculated according to a sigma-delta algorithm: for j=1, . . . , P, the j value that satisfies a condition (j*C1) mod P<$C_1$ is the position of the first channel of OSU service in the P PBs; . . . ; for the mth channel of OSU service, the distribution position of $C_m$ PBs in (P-$C_1$- . . . -$C_{m-1}$) PBs is calculated according to a sigma-delta algorithm: for j=1, . . . , (P-$C_1$- . . . -$C_{m-1}$), the j value that satisfies a condition (j*$C_m$) mod (P-$C_1$- . . . -$C_{m-1}$)<$C_m$ is the position of the mth channel of OSU service in the (P-$C_1$- . . . $C_{m-1}$) PBs. D. Calculation is performed according to the above-mentioned B and C operations by means of device software, and the calculation results form an OSU configuration table, and the OSU configuration table is sent to a single board. The OSU configuration table may be represented by the TPN number of the OSU and the position in the P PBs, or may be represented by the TPN of the OSU borne by each PB of the P PBs, or may be represented by other methods. E. When the bandwidth of the ith channel of OSU service is less than the bandwidth of $C_i$ PBs, one or more IDLE frames need to be inserted for speed adjustment. In the P PBs, M OSUs are mapped and multiplexed into the P PBs according to the OSU configuration table: the ith channel of OSU service borne by each PB is acquired; in a case where the data cached in a buffer corresponding to the ith channel of OSU service exceeds one PB, the ith channel of OSU service i is filled into the corresponding PB; otherwise, one or more IDLE frames are further filled into the corresponding PB. After the OSU service addition and deletion processing is performed, operation B to operation E are executed, that is, after the OSU service addition and deletion is completed, the OSU services need to be resorted, and then the position of each channel of OSU in the OPU is calculated according to the sorting result. Since the bandwidth of the ith channel of OSU service is less than the bandwidth of the Ci PBs, the ith channel of OSU service borne by each PB is acquired; in a case where data cached in the buffer corresponding to the ith channel of OSU service does not exceed one PB, it is judged whether an OSU OAM frame (which may be an OSU OAM frame of any service) exists; if so, the OSU OAM frame is inserted into the current PB preferentially; otherwise, the IDLE frame is inserted into the current PB.

Because the number of opportunities and the bearing positions of the user service in the P period are predetermined and therefore are static in the second mapping mechanism, the second mapping mechanism has the following disadvantages. When a data frame of a user service arrives, if the location assigned to the data frame has not yet arrived, the data of the data frame needs to be cached first, and this requires a large storage resource. When the data frame of the user service does not arrive yet at the position assigned to the data frame of the user service, this transmission opportunity is wasted, and this reduces the bearing efficiency. When the number of user services is increased or decreased or the rate of the user services changes, the opportunities and the bearer locations of all the user services in the P period need to be recalculated and adjusted, and the different user services affect each other. Therefore, the second mapping mechanism is applicable to an application scenario in which the rates of the user services are constant and the user services arrive uniformly, and is not applicable to scenarios in which there is jitter in the rates of the user services, or the number of the user services are increased or decreased during running, or the service bearer bandwidth is increased or decreased during running.

The embodiments of the present disclosure mainly propose a mapping and multiplexing method and apparatus for an optical transport network, an electronic device, and a storage medium. The technical solution may improve the rate jittering tolerance of the OSU service rate during mapping and multiplexing, and improve the utilization rate of mapping opportunities and the mapping bearing efficiency.

The embodiments of the present disclosure relate to a mapping and multiplexing method for an optical transport network. As shown in FIG. 1, the method includes the following operations 101 to 104.

At operation 101, a mapping opportunity generated by an Optical Channel Payload Unit (OPU) in a current transport window is provided to one or more Optical Service Unit (OSU) services, which satisfy a first scheduling condition, in a first queue, and in-queue scheduling is performed on the one or more OSU services, which satisfy the first scheduling condition, in the first queue so as to provide the mapping opportunity to one of the one or more OSU services in the first queue.

In an exemplary implementation, the width W of a transport window is an integral number of mapping bearing opportunities set by an optical transport network according to a payload rate of an OPU of a bearing layer. A special example is that the width W of the transport window may be set to an integral number of transport periods of the OPU, i.e., W=N*P, N being a positive integer. The width W of the transport window may alternatively be set to a non-integral number of transport periods of the OPU, but it should be ensured that the number of bearing opportunities in the non-integral number of transport periods is an integral number. The width W of the transport window is configurable and adjustable for controlling the smoothing effect. One transport period P of the OPU is formed by P continuous payload blocks. P denotes the maximum number of bearing opportunities provided in the transport period. The value of P is determined by an OPU payload rate and an OSU reference rate. The calculation formula for P is as follows:

$$P = \frac{OPU\ \text{PAYLOAD RATE} * (1 - OPU\ \text{Payload Rate Frequency Offset})}{OSU\ \text{REFERENCE RATE} * (1 + 1000\ \text{ppm})}$$

The OPU payload rate refers to a signal rate of a service layer (bearer layer), and may be containers such as high-order OPUs, low-order OPUs, OPUflex, OPUCn, and OTUw defined in the ITU-T G.709 standard. The OSU reference rate is a preset value, and is determined by the user service rate and the bandwidth bearing efficiency. The OSU reference rate may be configured as different values in different application scenarios, for example, the OSU reference rate may be configured as a preset value of 2.6 Mb/s in a telecommunication network, and OSU reference rate may be configured as a preset value of 2.4 Mb/s in a power system network.

In an exemplary implementation, when the OPU generates a mapping opportunity vld in the transport window, 1 is added to the original value of the mapping counter vld_cnt, and the value of vld_cnt is cycled from 1 to W.

In an exemplary implementation, each OSU service is preset with an initial mapping opportunity value Δj in one transport window. The initial mapping opportunity value is used to indicate the number of initial mapping opportunities required for the OSU service to enter mapping and multiplexing in the transport window. When the value of the mapping counter vld_cnt is accumulated to the initial mapping opportunity value Δj, the value of a window counter Jc_cnt of the OSU service is accumulated from 0 to 1, and when the value of Jc_cnt is accumulated to 1, it indicates that the OSU service starts to enter the mapping and multiplexing process in the transport window, and when the OSU service enters the mapping and multiplexing process in the transport window, the service mapping opportunity quantity Op is assigned to the OSU service. When the value of Jc_cnt increases to W, it indicates that the OSU service has undergone one transport period, and the value of Jc_cnt needs to accumulate starting from 0.

In an exemplary implementation, when the OSU service enters the mapping and multiplexing in the transport window, the service mapping opportunity quantity Op is assigned as N*C, where N is a positive integer, C is the number of payload blocks required by the OSU service to which the service mapping opportunity quantity belongs in one transport period of the OPU. The service mapping opportunity quantity Op may be configurable and adjustable for controlling a smoothing effect. The calculation formula for the value of C is as follows:

$$C = \frac{\text{USER SIGNAL RATE} * (1 + \text{USER SIGNAL RATE FREQUENCY DEVIATION}) * \frac{192}{185}}{OSU\ \text{REFERENCE RATE} * (1 - OPU\ \text{PAYLOAD RATE FREQUENCY OFFSET})}$$

In an exemplary implementation, when the mapping opportunity vld is generated, it is first determined whether each OSU service in the first queue meets the first scheduling condition, and an OSU service currently to be mapped and multiplexed is selected from respective OSU services that meet the first scheduling condition according to a preset scheduling rule. The first scheduling condition includes: there is an OSU frame to be sent, or the remaining service mapping opportunity quantity reaches a preset upper limit M_max of the remaining service mapping opportunity quantity.

In an exemplary implementation, in a case where the first scheduling condition satisfied by the OSU service which gets the mapping opportunity is that the remaining service mapping opportunity quantity reaches the preset upper limit M_max, the mapping opportunity that the OSU service gets is used to transmit a keep-alive frame or an idle frame.

At operation 102, in a case where there is no OSU service satisfying the first scheduling condition in the first queue, the mapping opportunity is provided to one or more OSU services, which satisfy a second scheduling condition, in a second queue, and in-queue scheduling is performed on the one or more OSU services, which satisfy the second scheduling condition, in the second queue so as to provide the mapping opportunity to one of the one or more OSU services in the second queue.

In an exemplary implementation, in a case where none of the OSU services in the first queue satisfies the first scheduling condition, whether the OSU services in the second queue satisfy the second scheduling condition is determined, and an OSU service currently to be mapped and multiplexed is selected from the OSU services satisfying the second scheduling condition according to a preset scheduling rule. The second scheduling condition includes: there is an OSU frame to be sent, and the remaining service mapping opportunity quantity is larger than a preset lower limit M_min of the remaining service mapping opportunity quantity. The upper limit M_max and the lower limit M_min of respective OSU service are independently set, and the specific values of the upper limit M_max and the lower limit M_min may be adjusted according to an application scenario, so that the bearer bandwidth of a user service in one transport period is no longer fixed to be equal to the value corresponding to C opportunities, and the bearer bandwidth may be dynamically adjusted as the real-time arrival rate of the user service fluctuates, so that the pipeline has elasticity. In addition, the two parameters (the upper limit M_max and the lower limit M_min) may be configured and adjusted so as to limit the speed of the user service. The upper limit M_max is used to control the lowest bearer rate of the user service, and the lower limit M_min is used to control the highest bearer rate of the user service.

At operation 103, a remaining service mapping opportunity quantity of the OSU service which gets the mapping opportunity is updated, wherein a service mapping opportunity quantity of respective OSU service in one transport window is independently set.

In an exemplary implementation, the service mapping opportunity quantity is assigned to the OSU service when the OSU service enters the mapping and multiplexing in the transport window. The service mapping opportunity quantity is the maximum number of service mapping opportunities that the OSU is able to get in the transport window, and is assigned to the OSU service according to a service requirement of each OSU service. In a case where the OSU service gets the mapping opportunity vld currently generated, the service mapping opportunity quantity of the OSU service is decreased by 1 to obtain the remaining service mapping opportunity quantity of the OSU service.

At operation 104, OSU services entering mapping and multiplexing in the current transport window are dynamically allocated to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue.

In an exemplary implementation, after the allocation of the newly generated mapping opportunity vld is completed and the remaining service mapping opportunity quantity of the OSU service is updated, the OSU services entering the mapping and multiplexing in the current transport window are dynamically allocated to the first queue and the second queue according to the updated remaining service mapping opportunity quantities of the OSU services. In a case where the remaining service mapping opportunity quantity of the OSU service satisfies a preset first queue condition, the OSU service enters the first queue; otherwise, the OSU service enters the second queue. Assuming that the preset first queue condition is whether the remaining service mapping opportunity quantity is greater than zero, in a case where the remaining service mapping opportunity quantity is greater than zero, the OSU service enters the first queue; and in a case where the remaining service mapping opportunity quantity is less than or equal to zero, the OSU service enters the second queue.

According to the mapping and multiplexing method for the optical transport network proposed in the embodiments of the present disclosure, in a mapping and multiplexing process of the optical transport network, a mapping opportunity generated by an Optical Channel Payload Unit (OPU) in a current transport window is first provided to one or more Optical Service Unit (OSU) services, which satisfy a first scheduling condition, in a first queue, and in-queue scheduling is performed on the one or more OSU services, which satisfy the first scheduling condition, in the first queue so as to provide the mapping opportunity to one of the one or more OSU services in the first queue; in a case where there is no OSU service satisfying the first scheduling condition in the first queue, the mapping opportunity is provided to one or more OSU services, which satisfy a second scheduling condition, in a second queue, and in-queue scheduling is performed on the one or more OSU services, which satisfy the second scheduling condition, in the second queue so as to provide the mapping opportunity to one of the one or more OSU services in the second queue; a remaining service mapping opportunity quantity of the OSU service which gets the mapping opportunity is updated, wherein a service mapping opportunity quantity of respective OSU service in one transport window is independently set; and OSU services entering mapping and multiplexing in the current transport window are dynamically assigned to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue. By virtue of the solution, a transport window is set in an OPU, the mapping opportunity generated in the transport window is provided to an OSU service which needs mapping and multiplexing and satisfies a scheduling condition, in this way, when rate jitter of the OSU service happens, a smoothing effect can be achieved for the service rate, and the rate jittering tolerance of the OSU service during mapping and multiplexing can be expanded, furthermore, each mapping opportunity can be fully used, thereby improving the mapping bearing efficiency. The embodiments of the present disclosure solve the technical problems that, when the rate jitter of the OSU service is large, both the method using a sigma-delta algorithm and the method based on polling scheduling would lead to large deviation between the OSU service rate and the bearer bandwidth, which results in low mapping opportunity utilization efficiency and low mapping bearing efficiency.

The embodiment of the present disclosure relates to a mapping and multiplexing method for an optical transport network. As shown in FIG. 2, the mapping and multiplexing method for the optical transport network includes the following operations 201 to 205.

At operation 201, a mapping opportunity generated by an OPU in a current transport window is provided to one or more OSU services, which satisfy a first scheduling condition, in a first queue, and in-queue scheduling is performed on the one or more OSU services, which satisfy the first scheduling condition, in the first queue so as to provide the mapping opportunity to one of the one or more OSU services in the first queue.

In an exemplary implementation, this operation is substantially the same as operation 101 in the above embodiment of the present disclosure, and therefore is not described in detail herein.

At operation 202, in a case where there is no OSU service satisfying the first scheduling condition in the first queue, the mapping opportunity is provided to one or more OSU services, which satisfy a second scheduling condition, in a second queue, and in-queue scheduling is performed on the one or more OSU services, which satisfy the second scheduling condition, in the second queue so as to provide the mapping opportunity to one of the one or more OSU services in the second queue.

In an exemplary implementation, this operation is substantially the same as operation 102 in the above embodiment of the present disclosure, and therefore is not described in detail herein.

At operation 203, a remaining service mapping opportunity quantity of the OSU service which gets the mapping opportunity is updated, wherein a service mapping opportunity quantity of respective OSU service in one transport window is independently set.

In an exemplary implementation, this operation is substantially the same as operation 103 in the above embodiment of the present disclosure, and therefore is not described in detail herein.

At operation 204, OSU services entering mapping and multiplexing in the current transport window are dynamically allocated to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue.

In an exemplary implementation, this operation is substantially the same as operation 104 in the above embodiment of the present disclosure, and therefore is not described in detail herein.

At operation 205, when a service window of the OSU service ends, the remaining service mapping opportunity quantity of the OSU service is recorded, wherein a width of the service window is the same as a width of the transport window, and the service window is opened when the OSU service enters the mapping and multiplexing in the transport window; and after the OSU service enters the mapping and multiplexing in a next transport window, the service mapping opportunity quantity is accumulated based on the recorded remaining service mapping opportunity quantity.

In an exemplary implementation, when the OSU service starts to enter the mapping and multiplexing in the current transport window, the service window of the OSU service starts, and the value Jc_cnt of the window counter of the OSU service is incremented to 1; in a case where the value Jc_cnt of the window counter of the OSU service is accumulated to be equal to the width W of the transport window, it represents that in the current transport window, the service window of the OSU service ends, and the remaining service mapping opportunity quantity of the OSU service in the current transport window needs to be recorded, so that after the OSU service enters the mapping and multiplexing in the next transport window, the original service mapping opportunity quantity Op is accumulated based on the recorded remaining service mapping opportunity quantity M.

In the present embodiment of the present disclosure, in addition to the operations of the other embodiments, when the service window of the OSU service in the transport window ends, the remaining service mapping opportunity quantity of the OSU service may be recorded, and the remaining service mapping opportunity quantity is accumulated into the service mapping opportunity quantity of the next transport window of the OSU service based on the remaining service mapping opportunity quantity, so as to ensure that the service mapping opportunity quantity of the OSU service can be fully used.

Figure 3:
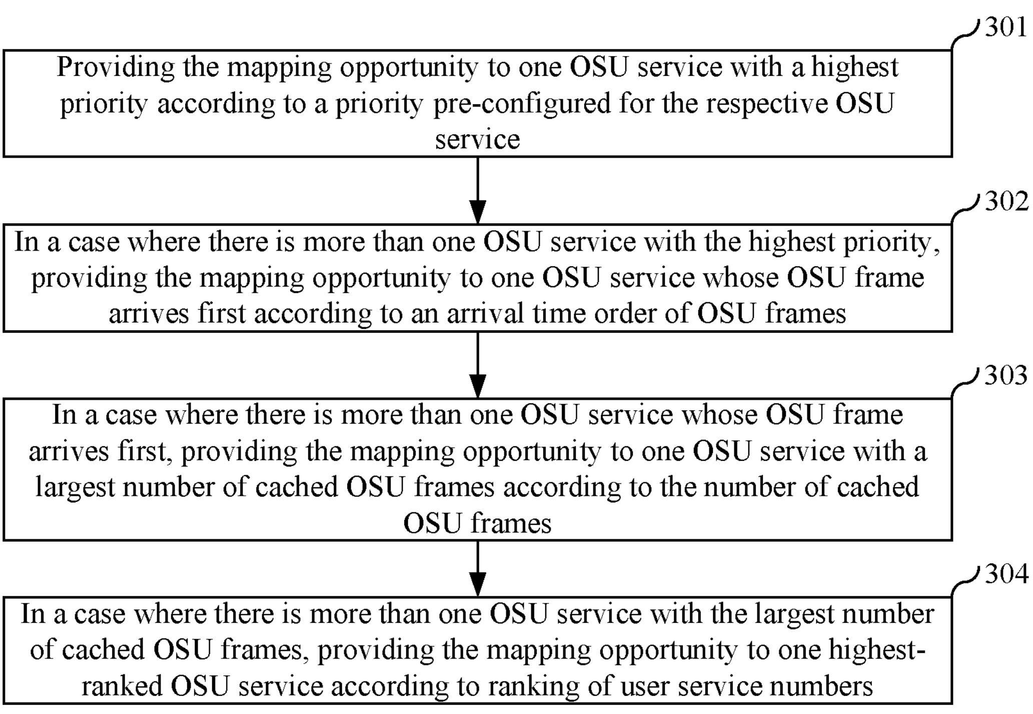
FIG. 3 is a flowchart of a mapping and multiplexing method for an optical transport network according to an embodiment of the present disclosure.

The embodiments of the present disclosure relate to a queue scheduling method. The method is applied to scheduling of the first queue or the second queue in a mapping and multiplexing process of an optical transport network. As shown in FIG. 3, the method includes the following operations 301 to 304.

At operation 301, the mapping opportunity is provided to one OSU service with a highest priority among the one or more OSU services according to a priority pre-configured for the respective OSU service.

In an exemplary implementation, when there are multiple OSU services satisfying the scheduling condition in the queue, the OSU service with the highest priority may be screened out from the multiple OSU services satisfying the scheduling condition according to the preset priority of the OSU service, and the mapping opportunity may be provided to the OSU service with the highest priority.

At operation 302, in a case where there are a plurality of OSU services with the highest priority, the mapping opportunity is provided to one OSU service whose OSU frame arrives first among the plurality of OSU services with the highest priority according to an arrival time order of OSU frames.

In an exemplary implementation, when there are multiple OSU services with the highest priority, and an OSU service to which the mapping opportunity is to be provided cannot be selected according to the priority, arrival time of OSU frames of all the OSU services with the highest priority may be acquired, and the mapping opportunity is provided to the firstly arrived OSU service according to the arrival time of the OSU frames in a descending order.

At operation 303, in a case where there are a plurality of OSU services whose OSU frame arrives first, the mapping opportunity is provided to one OSU service with a largest number of cached OSU frames among the plurality of OSU services whose OSU frame arrives first according to the number of cached OSU frames.

In an exemplary implementation, when multiple OSU services arrive at the same time and an OSU service to which the mapping opportunity is to be provided cannot be selected according to the arrival time, the number of cached OSU frames of respective OSU service can be acquired, and the respective OSU service is ordered according to the number of cached OSU frames in a descending order, and the mapping opportunity is preferentially provided to an OSU service with the largest number of cached OSU frames.

At operation 304, in a case where there are a plurality of OSU services with the largest number of cached OSU frames, the mapping opportunity is provided to one highest-ranked OSU service among the plurality of OSU services with the largest number of cached OSU frames according to ranking of user service numbers.

In an exemplary implementation, when multiple OSU services have the same number of cached OSU frames, and an OSU service to which the mapping opportunity is to be provided cannot be selected according to the number of cached OSU frames, the sequencing of a user service number of respective OSU service can be acquired, and the mapping opportunity is preferentially provided to an OSU service with the highest user service number sequencing. Herein, the maximum value of the user service number $N_e$ represents the maximum number of user services that can be borne by a service layer.

In an exemplary implementation, for an OSU service that gets a mapping opportunity, an OSU data frame of the scheduled OSU service is read from a data storage area and is mapped into an OPU payload area. In a case where neither the first queue nor the second queue has an OSU service meeting the scheduling condition, an IDLE frame is filled into the OPU payload. In a case where there is a need to transmit other non-data frames, the IDLE frame may be replaced with other non-data frames, such as a network operation and maintenance management (e.g., OAM) frame, a protocol layer communication frame, etc.

In the embodiment of the present disclosure, based on the operations described in other embodiments, when various OSU services satisfying the scheduling condition in the first queue or the second queue are scheduled, scheduling judgment can be performed on the various OSU services in combination with various conditions, so that the scheme provided in the amendment of the present disclosure can reasonably schedule the various OSU services satisfying the scheduling condition.

The operation division of the above various methods is only for the purpose of clear description, and during implementation, the methods may be combined into one operation or certain operation may be divided into multiple operations, and all the operations are within the scope of protection of the present patent as long as they include the same logic relationship. Any insignificant modification to or introduction of insignificant designs into the algorithms or flows, without changing the core design of the algorithms and flows, falls within the scope of protection of the present disclosure.

Figure 4:
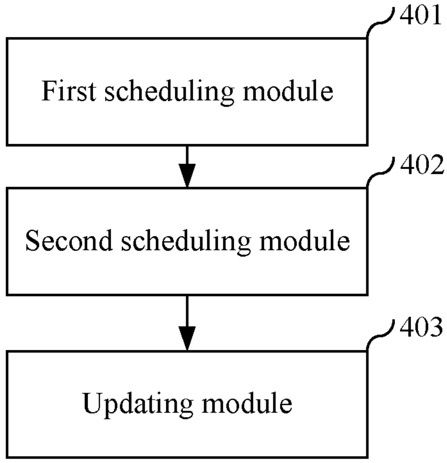
FIG. 4 is a schematic structural diagram of a mapping and multiplexing apparatus for an optical transport network according to an embodiment of the present disclosure.

The embodiments of the present disclosure also relate to a mapping and multiplexing apparatus for an optical transport network. FIG. 4 is a schematic diagram of a mapping and multiplexing apparatus for an optical transport network of the embodiment. The mapping and multiplexing apparatus includes: a first scheduling module 401, a second scheduling module 402 and an updating module 403.

The first scheduling module 401 is configured to first provide a mapping opportunity generated by an Optical Channel Payload Unit (OPU) in a current transport window to one or more Optical Service Unit (OSU) services, which satisfy a first scheduling condition, in a first queue, and perform in-queue scheduling on the one or more OSU services in the first queue so as to provide the mapping opportunity to one of the one or more OSU services in the first queue.

The second scheduling module 402 is configured to, in a case where there is no OSU service satisfying the first scheduling condition in the first queue, provide the mapping opportunity to one or more OSU services, which satisfy a second scheduling condition, in a second queue, and perform in-queue scheduling on the one or more OSU services in the second queue so as to provide the mapping opportunity to one of the one or more OSU services in the second queue.

The updating module 403 is configured to update a remaining service mapping opportunity quantity of the OSU service which gets the mapping opportunity, wherein a service mapping opportunity quantity of respective OSU service in one transport window is independently set.

In an exemplary implementation, the updating module 403 is further configured to dynamically allocate OSU services entering mapping and multiplexing in the current transport window to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue.

It is easily found that this embodiment is a system embodiment corresponding to the foregoing method embodiment, and this embodiment may be implemented in cooperation with the foregoing method embodiment. Related technical details and technical effects mentioned in the foregoing embodiments are still effective in this embodiment, and are not described herein again to reduce repetition. Correspondingly, related technical details mentioned in this embodiment may also be applied in the foregoing embodiments.

It should be noted that all modules involved in this embodiment are logic modules. In a practical application, one logic unit may be one physical unit or a part of one physical unit, and may also be implemented by using a combination of multiple physical units. In addition, in order to highlight the innovation part of the present disclosure, the present embodiment does not introduce units less closely related to solving the technical problem proposed in the present disclosure, but this does not indicate that other units do not exist in the present embodiment.

Figure 5:
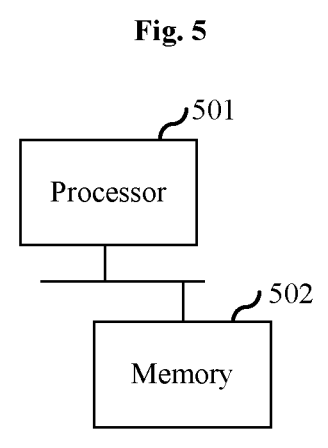

The embodiments of the present disclosure also relate to an electronic device. As shown in FIG. 5, the electronic device includes: at least one processor 501; and a memory 502 communicatively connected to the at least one processor 501; the memory 502 stores an instruction that can be executed by the at least one processor 501, where the instruction is executed by the at least one processor 501, so that the at least one processor 501 executes the mapping and multiplexing method for the optical transport network in each of the foregoing embodiments.

The memory and the processor are connected via a bus, the bus may include any number of interconnected buses and bridges, and the bus connects various circuits of the one or more processors and the memory together. The bus may also connect a variety of other circuits, such as peripheral devices, voltage regulators, and power management circuitry, which are well known in the art and therefore are not described further herein. The bus interface provides an interface between the bus and a transceiver. The transceiver may be one element or multiple elements, such as multiple receivers and transmitters, which provide a means for communicating with various other devices over a transmission medium. Data processed by the processor is transmitted on a wireless medium through an antenna, and further, the antenna receives the data and transmits the data to the processor.

The processor is responsible for managing the bus and general processing, and may further provide various functions, including timing, peripheral interfaces, voltage regulation, power management, and other control functions. The memory may be used to store data used by the processor in performing operations.

The embodiments of the present disclosure relate to a computer-readable storage medium, which stores a computer program. The computer program implements the foregoing method embodiments when being executed by a processor.

That is, a person having ordinary skill in the art may understand that all or a part of the operations of the methods in the foregoing embodiments may be implemented by a program instructing relevant hardware. The program is stored in a storage medium and includes several instructions for instructing a device (which may be a single chip, a chip, or the like) or a processor to execute all or a part of the operations of the methods in the embodiments of the present disclosure. The foregoing storage medium includes: any medium that can store program codes, such as a USB flash disk, a removable hard disk, a Read-Only Memory (ROM), a Random Access Memory (RAM), a magnetic disk, or an optical disk.

A person having ordinary skill in the art may understand that the foregoing embodiments are exemplary embodiments for implementing the present disclosure, and in practical applications, various changes may be made in form and details without departing from the principle and scope of the present disclosure.

What is claimed is:

1. A mapping and multiplexing method for an optical transport network, the mapping and multiplexing method comprising:

first providing a mapping opportunity generated by an Optical Channel Payload Unit (OPU) in a current transport window to one or more Optical Service Unit (OSU) services, which satisfy a first scheduling condition, in a first queue, and performing in-queue scheduling on the one or more OSU services, which satisfy the first scheduling condition, in the first queue so as to provide the mapping opportunity to one of the one or more OSU services in the first queue, wherein the first scheduling condition comprises: there is an OSU frame to be sent, or the remaining service mapping opportunity quantity reaches a preset upper limit M_max of the remaining service mapping opportunity quantity; and the second scheduling condition comprises: there is an OSU frame to be sent, and the remaining service mapping opportunity quantity is larger than a preset lower limit M_min of the remaining service mapping opportunity quantity; wherein the upper limit M_max and the lower limit M_min of respective OSU service are independently set;

in a case where there is no OSU service satisfying the first scheduling condition in the first queue, providing the mapping opportunity to one or more OSU services, which satisfy a second scheduling condition, in a second queue, and performing in-queue scheduling on the one or more OSU services, which satisfy the second scheduling condition, in the second queue so as to provide the mapping opportunity to one of the one or more OSU services in the second queue;

updating a remaining service mapping opportunity quantity of the OSU service which gets the mapping opportunity, wherein a service mapping opportunity quantity of respective OSU service in one transport window is independently set; and dynamically allocating OSU services entering mapping and multiplexing in the current transport window to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue.

2. The mapping and multiplexing method for the optical transport network according to claim 1, wherein an initial mapping opportunity value Δj of the OSU service in one transport window is preset, and the initial mapping opportunity value indicates the number of initial mapping opportunities required for the OSU service to enter the mapping and multiplexing in the transport window; and the service mapping opportunity quantity is assigned to the OSU service when the OSU service enters the mapping and multiplexing in the transport window.

3. The mapping and multiplexing method for the optical transport network according to claim 1, the mapping and multiplexing method further comprising:

when a service window of the OSU service ends, recording the remaining service mapping opportunity quantity of the OSU service, wherein a width of the service window is the same as a width of the transport window, and the service window is opened when the OSU service enters the mapping and multiplexing in the transport window; and after the OSU service enters the mapping and multiplexing in a next transport window, accumulating the service mapping opportunity quantity based on the recorded remaining service mapping opportunity quantity.

4. The mapping and multiplexing method for the optical transport network according to claim 1, wherein in a case where the first scheduling condition satisfied by the OSU service which gets the mapping opportunity is that the remaining service mapping opportunity quantity reaches the preset upper limit M_max, the mapping opportunity that the OSU service gets is used to transmit a keep-alive frame or an idle frame.

5. The mapping and multiplexing method for the optical transport network according to claim 4, wherein an Operation, Administration, and Maintenance (OAM) frame is preferentially inserted in a case where the mapping opportunity that the OSU service gets is used to transmit the idle frame.

6. The mapping and multiplexing method for the optical transport network according to claim 1, wherein a width of the transport window is N transport periods of the OPU; and the service mapping opportunity quantity is N×C, wherein N is a positive integer, and C is the number of payload blocks required by the OSU service to which the service mapping opportunity quantity belongs in one transport period of the OPU.

7. The mapping and multiplexing method for the optical transport network according to claim 1, wherein dynamically allocating the OSU services entering the mapping and multiplexing in the current transport window to the first queue and the second queue according to the remaining service mapping opportunity quantity of the respective OSU service comprises:

allocating the OSU service of which the remaining service mapping opportunity quantity is greater than 0 to the first queue, and allocating the OSU service of which the remaining service mapping opportunity quantity is equal to or less than 0 to the second queue.

8. The mapping and multiplexing method for the optical transport network according to claim 1, wherein performing the in-queue scheduling comprises:

providing the mapping opportunity to one OSU service with a highest priority among the one or more OSU services according to a priority pre-configured for the respective OSU service;

in a case where there are a plurality of OSU services with the highest priority, providing the mapping opportunity to one OSU service whose OSU frame arrives first among the plurality of OSU services with the highest priority according to an arrival time order of OSU frames;

in a case where there are a plurality of OSU services whose OSU frame arrives first, providing the mapping opportunity to one OSU service with a largest number of cached OSU frames among the plurality of OSU services whose OSU frame arrives first according to the number of cached OSU frames; and in a case where there are a plurality of OSU services with the largest number of cached OSU frames, providing the mapping opportunity to one highest-ranked OSU service among the plurality of OSU services with the largest number of cached OSU frames according to ranking of user service numbers.

9. The mapping and multiplexing method for the optical transport network according to claim 1, wherein a width W of the transport window is an integral number of mapping opportunities set by the optical transport network according to a payload rate of the OPU of a bearing layer.

10. The mapping and multiplexing method for the optical transport network according to claim 9, wherein the width W of the transport window is set to W=N*P, P being a transport period of the OPU, one transport period of the OPU is formed by P continuous payload blocks, and N being a positive integer.

11. The mapping and multiplexing method for the optical transport network according to claim 10, wherein the value of P is determined by an OPU payload rate and an OSU reference rate.

12. The mapping and multiplexing method for the optical transport network according to claim 10, wherein $$P = \frac{OPU \text{ PAYLOAD RATE} * (1 - OPU \text{ Payload Rate Frequency Offset})}{OSU \text{ REFERENCE RATE} * (1 + 1000\,\text{ppm})}.$$

13. The mapping and multiplexing method for the optical transport network according to claim 9, wherein the width W of the transport window is set to a non-integral number of transport periods of the OPU, and the number of matching opportunities in the non-integral number of transport periods of the OPU is an integral number.

14. The mapping and multiplexing method for the optical transport network according to claim 9, wherein the width W of the transport window is configurable and adjustable for controlling a smoothing effect.

15. The mapping and multiplexing method for the optical transport network according to claim 1, wherein when the OSU service enters the mapping and multiplexing in the transport window, the service mapping opportunity quantity Op is assigned as N*C, wherein N is a positive integer, C is the number of payload blocks required by the OSU service to which the service mapping opportunity quantity belongs in one transport period of the OPU.

16. The mapping and multiplexing method for the optical transport network according to claim 15, wherein the service mapping opportunity quantity Op is configurable and adjustable for controlling a smoothing effect, and a calculation formula for a value of C is as follows:

$$C = \frac{\text{USER SIGNAL RATE} * (1 + \text{USER SIGNAL RATE FREQUENCY DEVIATION}) * \frac{192}{185}}{OSU \text{ REFERENCE RATE} * (1 - OPU \text{ PAYLOAD RATE FREQUENCY OFFSET})}.$$

17. The mapping and multiplexing method for the optical transport network according to claim 1, wherein dynamically allocating OSU services entering mapping and multiplexing in the current transport window to the first queue and the second queue according to the remaining service mapping opportunity quantity of respective OSU service comprises:

in a case where the remaining service mapping opportunity quantity of the OSU service satisfies a preset first queue condition, the OSU service enters the first queue; otherwise, the OSU service enters the second queue, wherein the preset first queue condition is whether the remaining service mapping opportunity quantity is greater than zero.

18. An electronic device, comprising:

at least one processor; and a memory communicatively coupled to the at least one processor, wherein the memory stores an instruction executable by the at least one processor, and the at least one processor is configured to run the instruction to execute the following operations:

first providing a mapping opportunity generated by an Optical Channel Payload Unit (OPU) in a current transport window to one or more Optical Service Unit (OSU) services, which satisfy a first scheduling condition, in a first queue, and performing in-queue scheduling on the one or more OSU services, which satisfy the first scheduling condition, in the first queue so as to provide the mapping opportunity to one of the one or more OSU services in the first queue, wherein the first scheduling condition comprises: there is an OSU frame to be sent, or the remaining service mapping opportunity quantity reaches a preset upper limit M_max of the remaining service mapping opportunity quantity; and the second scheduling condition comprises: there is an OSU frame to be sent, and the remaining service mapping opportunity quantity is larger than a preset lower limit M_min of the remaining service mapping opportunity quantity; wherein the upper limit M_max and the lower limit M_min of respective OSU service are independently set;

in a case where there is no OSU service satisfying the first scheduling condition in the first queue, providing the mapping opportunity to one or more OSU services, which satisfy a second scheduling condition, in a second queue, and performing in-queue scheduling on the one or more OSU services, which satisfy the second scheduling condition, in the second queue so as to provide the mapping opportunity to one of the one or more OSU services in the second queue;

updating a remaining service mapping opportunity quantity of the OSU service which gets the mapping opportunity, wherein a service mapping opportunity quantity of respective OSU service in one transport window is independently set; and dynamically allocating OSU services entering mapping and multiplexing in the current transport window to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue.

19. A non-transitory computer-readable storage medium, storing a computer program, wherein the computer program, when being executed by a processor, causes the processor to execute the following operations:

first providing a mapping opportunity generated by an Optical Channel Payload Unit (OPU) in a current transport window to one or more Optical Service Unit (OSU) services, which satisfy a first scheduling condition, in a first queue, and performing in-queue scheduling on the one or more OSU services, which satisfy the first scheduling condition, in the first queue so as to provide the mapping opportunity to one of the one or more OSU services in the first queue, wherein the first scheduling condition comprises: there is an OSU frame to be sent, or the remaining service mapping opportunity quantity reaches a preset upper limit M_max of the remaining service mapping opportunity quantity; and the second scheduling condition comprises: there is an OSU frame to be sent, and the remaining service mapping opportunity quantity is larger than a preset lower limit M_min of the remaining service mapping opportunity quantity; wherein the upper limit M_max and the lower limit M_min of respective OSU service are independently set;

in a case where there is no OSU service satisfying the first scheduling condition in the first queue, providing the mapping opportunity to one or more OSU services, which satisfy a second scheduling condition, in a second queue, and performing in-queue scheduling on the one or more OSU services, which satisfy the second scheduling condition, in the second queue so as to provide the mapping opportunity to one of the one or more OSU services in the second queue;

updating a remaining service mapping opportunity quantity of the OSU service which gets the mapping opportunity, wherein a service mapping opportunity quantity of respective OSU service in one transport window is independently set; and dynamically allocating OSU services entering mapping and multiplexing in the current transport window to the first queue and the second queue according to the remaining service mapping opportunity quantity of respective OSU service, wherein the remaining service mapping opportunity quantity of the OSU service assigned to the first queue is greater than the remaining service mapping opportunity quantity of the OSU service assigned to the second queue.

* * * * *